Dec. 19, 1939.  S. C. HOARE  2,183,566
REPULSION-ATTRACTION TYPE CURRENT RESPONSIVE INSTRUMENT
Filed Sept. 29, 1937   2 Sheets-Sheet 1
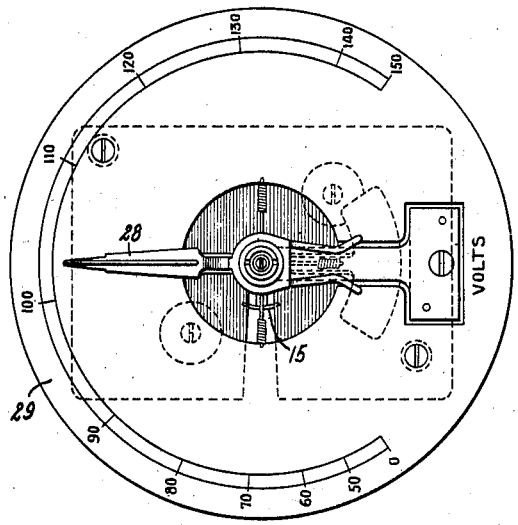
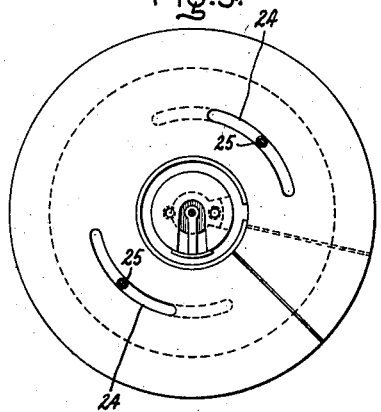
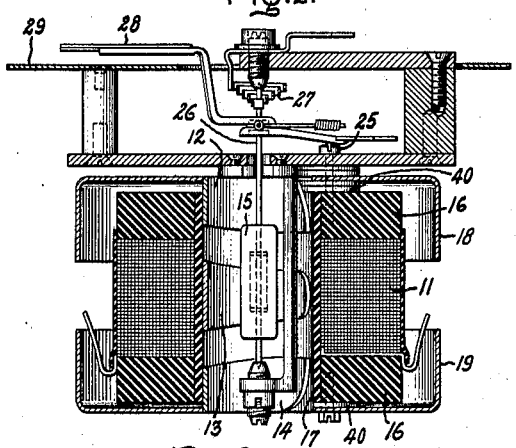
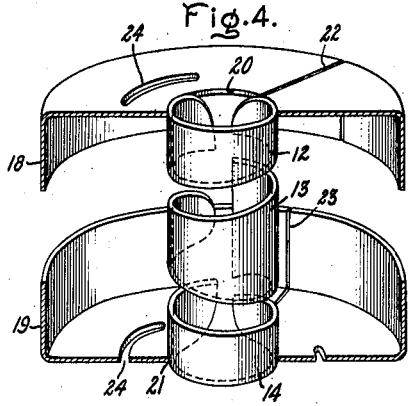
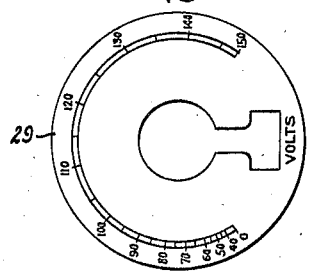
Inventor:
Stephen C. Hoare,
by Harry E. Dunham
His Attorney.

Dec. 19, 1939.   S. C. HOARE   2,183,566
REPULSION-ATTRACTION TYPE CURRENT RESPONSIVE INSTRUMENT
Filed Sept. 29, 1937    2 Sheets-Sheet 2
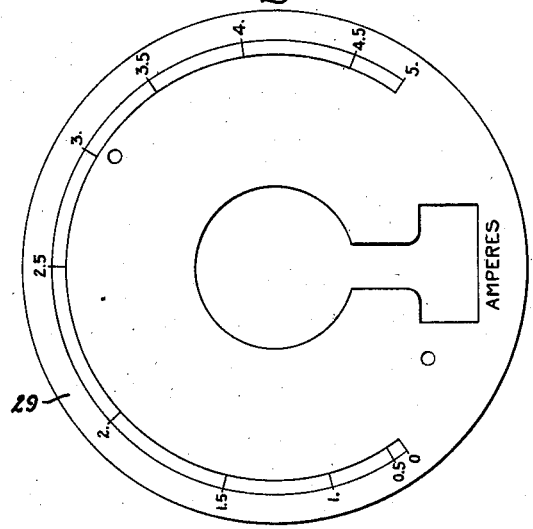
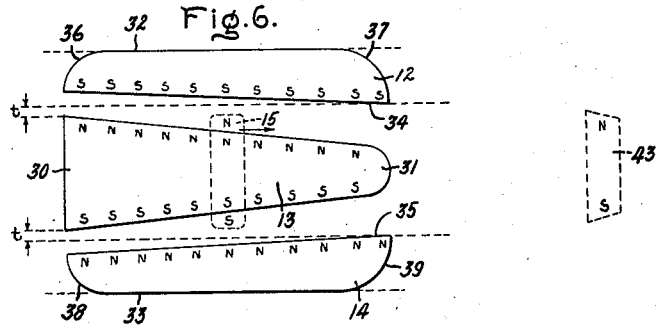
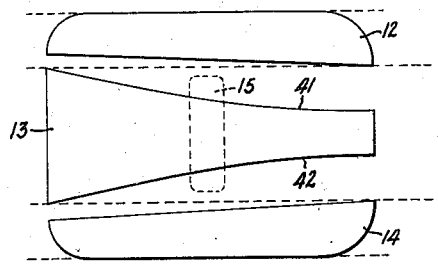
Inventor:
Stephen C. Hoare,
by Harry E. Dunham
His Attorney.

Patented Dec. 19, 1939

2,183,566

UNITED STATES PATENT OFFICE 2,183,566

REPULSION-ATTRACTION TYPE CURRENT RESPONSIVE INSTRUMENT

Stephen C. Hoare, Manchester, Mass., assignor to General Electric Company, a corporation of New York Application September 29, 1937, Serial No. 166,360

5 Claims. (Cl. 171—95)

My invention relates to current responsive devices. It concerns particularly deflecting measuring instruments.

It is an object of my invention to provide an electrical instrument construction suitable for large angular deflections and long scales. It is another object of my invention to provide such devices capable of producing relatively high torque for a given amount of current. Still another object of my invention is to provide such instruments having relatively open scales and having more nearly uniform scale distribution at the upper and lower ends than have heretofore been available.

It is also an object of my invention to provide an instrument of the repulsion type in which the scale distribution in any desired portion of the scale may be adjusted.

Further objects and advantages of my invention will become apparent as the description proceeds.

Electrical measuring instruments have long been known operating on what is called the repulsion principle in which there is a magnetizing current conducting winding surrounding a pair of relatively movable magnetizable vanes, or as they are often called, irons, since in the earlier forms of the instruments they were composed of soft iron. Owing to the fact that the vanes are magnetized with like polarity and the like poles are adjacent to each other, the vanes tend to repel each other. If a suitable control device, such as a spiral control spring, is provided, the position of the movable vane serves as a measure of current, since the degree of magnetization and the strength of repulsion varies with the strength of the current flowing through the winding. Conventional instruments operating upon repulsion alone tend to give a crowded scale at the upper end owing to counterrepulsion. Usually the length of scale is restricted to about 90 degrees, although instruments may be arranged for use up to about 150 degrees, scale length, by properly shaping the irons. However, beyond 90 degrees the field coil losses tend to mount rapidly since relatively large currents are required.

I have found that by combining the attraction principle with the repulsion principle by adding auxiliary vanes or irons which I call attraction irons, and by properly shaping and placing the irons an improved scale distribution may be obtained and the torque may be increased substantially. More particularly, the scale may be made more open at the upper and lower ends. In carrying out my invention in its preferred form I provide a current coil and a movable vane as in instruments of known types. However, I add auxiliary or attraction irons having their inner edges converging. The main or repulsion iron is tapered toward the up-scale position of the movable vane and the converging ends of the attraction irons are also at the up-scale position of the movable vane. The edges of the repulsion iron and likewise the inner edges of the attraction irons form converging helices. Owing to the fact that the auxiliary or attraction irons converge, the distance between the ends of the movable iron and the inner ends of the attraction irons becomes less as the movable element moves up scale and the force of attraction increases. In this way the scale is opened up considerably at the up-scale end where it would ordinarily be extremely crowded. Preferably, I also provide angular and longitudinal adjustment of the stationary irons in order to obtain any moderate variations in scale distribution that may be desired and by changing the dimensions and shape of the various irons I may obtain still further variations in scale distribution.

The invention may be understood more readily from the following detailed description when considered in connection with the accompanying drawings and those features of the invention which are believed to be novel and patentable will be pointed out in the claims appended hereto. In the drawings Figure 1 is a plan view of one embodiment of my invention showing the scale and the pointer carried by the movable element. This form of the invention is well adapted for obtaining a scale distribution which is desirable in voltmeters. Figure 2 is a view of the arrangement of Figure 1 primarily in longitudinal section. Figure 3 is a top plan view of the arrangement of Figures 1 and 2 with the pointer and scale and the structure above the actual torque producing movement removed. Figure 4 is a perspective view with a portion cut away to show a partial longitudinal section of the stationary portions of the magnetic circuit of the apparatus of Figures 1 to 3. Figure 5 is a plan view showing the scale obtained in another embodiment of my invention with a scale distribution particularly desirable for measuring amperes. Figure 6 is a diagram showing a development of the surfaces of the stationary and movable irons used in the arrangement of Figures 1 to 4. Figure 7 is a diagram showing a development of the surfaces of the stationary and movable irons in a modified arrangement represented by Figure 5, and Figure 8 is a modified voltmeter scale illustrating one change in scale distribution which may be obtained in accordance with my invention. Like reference characters are utilized throughout the drawings to designate like parts.

As illustrated in Figure 2, the apparatus consists basically of a current conducting winding or coil 11 surrounding stationary magnetizable elements or irons 12, 13 and 14 and a pivotally mounted revoluble vane or movable iron 15. The movable vane 15 is so related to the stationary irons 12, 13 and 14 that an axial magnetic field produced by an electric current flowing through the winding 11 induces magnetic poles in the stationary and movable irons and the mutual forces of repulsion and attraction bring about movement of the vane 15. As will be explained more in detail hereinafter the desired scale distribution is obtained by the shaping and placing of the stationary irons 12, 13 and 14.

The coil 11 may be wound upon a spool formed by a pair of end pieces 16 surrounding a hollow cylinder or winding form 17. The parts 16 and 17 are preferably non-magnetic and may be composed of insulating material. If desired the parts 16 and 17 may be molded in one piece from plastic material and furthermore one or more of the stationary irons 12, 13 and 14 may also be molded into the winding form 17. Of course, where adjustability is desired at least one of the stationary irons will be mounted angularly or longitudinally movable within the winding form 17.

The magnetizable members 12, 13, 14 and 15 may be composed of any suitable magnetizable material such as silicon steel or soft iron, but I prefer to use a relatively high permeability material such as an alloy of 46 to 48 per cent nickel and the remainder iron or an alloy such as that described in Patent 1,586,884 to Elmen having approximately 78½ per cent nickel and the remainder iron. Nevertheless, owing to the common use of soft iron in electrical instruments of the moving vane type, parts such as the members 12, 13, 14 and 15 are commonly referred to as "irons" and I shall use the term "irons" in both the descriptions and claims to include any suitable magnetizable material or alloy.

In order to increase somewhat the available torque and in order to provide partial shielding against the effect of external fields I may provide cup-shaped members 18 and 19 which may be composed of any suitable magnetizable material such as one of those discussed in connection with stationary and movable irons 12, 13, 14 and 15. The cup-shaped members 18 and 19 have circular openings 20 and 21 in the base portions thereof which may be approximately the same in diameter as the inner surface of the winding form 17 so that the outer edges of the auxiliary irons 12 and 14 meet the edges of the openings 20 and 21 in the cup-shaped members 18 and 19. Preferably the cup-shaped members 18 and 19 are slitted radially at 22 and 23 in the portions opposite the gaps between the ends of the auxiliary irons 12 and 14 in order to avoid interference with distribution of magnetization of the auxiliary irons. If desired the auxiliary irons 12 and 14 may be secured to the cup-shaped members 18 and 19 in any suitable manner, e. g., by tack welding and angular adjustment of the auxiliary irons may be obtained by rotating the cup-shaped members 18 and 19. For this purpose the cup-shaped members 18 and 19 or at least one of them may be provided with arcuate slots 24 cooperating with suitable rivets or screws 25 fastened in some portion of the stationary part of the apparatus such as the spool ends 16.

A shaft 26 is provided for carrying the movable iron 15. In the arrangement illustrated, in order to provide a uniform air gap, the shaft is mounted substantially co-axially with the winding form 17 with the vane 15 offset sufficiently from the shaft 25 so that the vane 15 will be carried along close to the inner surface of the stationary irons 12, 13 and 14 which, in turn, line the substantially circular cylindrical inner surface of the winding form 17. The construction shown provides a good scale distribution but it will be understood that my invention is not limited to this precise distribution and to having the shaft concentric with the stationary irons and having the latter of constant radius. The shaft 26 is mounted in suitable bearings secured to a stationary portion of the apparatus and a biasing spring 27 is provided for obtaining a control torque. For indicating measurements I further provide a pointer 28 carried by the shaft 26 and a scale 29 having graduations cooperating with the pointer 28.

The shape and placing of the stationary irons 12, 13 and 14 may be explained more readily by means of the diagram of Fgure 6 showing the developed surfaces. It will be seen that the axial length of the movable iron 15 is approximately the same as the width of the base portion 30 of the main or repulsion iron 13 which is wedge shaped and has a rounded apex 31. As a matter of convenience the outer edges 32 and 33 of the auxiliary attraction irons 12 and 14, respectively are parallel, but this is not a necessary feature of my invention. However, I consider it important in order to obtain the most desirable scale distribution with a relatively open scale and high torque in the upper regions of the angular deflection, that the inner edges 34 and 35 of the attraction irons 12 and 14 should converge toward the upscale position of the movable vane 15. The foregoing statement applies to the construction illustrated, in which the stationary irons 12, 13 and 14 follow the surface of a circular cylinder, coaxial with the shaft 26. It will be understood, however, that I am not limited to the specific structural arrangement shown for causing the unlike poles of the movable vane 15 and the attraction irons 12 and 14 to become closer as the instrument deflects up scale, or for causing the attractive forces to increase as the instrument deflects up scale. It will be observed that the converging ends of the inner edges 34 and 35 are at the same end of the stationary irons as the apex 31 of the repulsion iron 13. It will be understood that the movable iron 15 approaches the apex 31 and the converging ends of the attraction irons as the pointer 28 moves upscale. Although I have shown a pair of attraction irons 12 and 14 for the sake of balance and symmetry, it will be understood that my invention is not limited to the use of both of them and one may be omitted if desired. Likewise, my invention is not limited to having the attraction irons 12 and 14 extend the full circumferential length of the repulsion iron 13 and for obtaining certain scale distributions I may prefer to use shorter attraction irons which do not extend into the down scale region of the repulsion iron.

As indicated already the instrument operates by magnetic repulsion and attraction between the stationary and movable vanes. It will be understood that for the zero position of the instrument the movable vane 15 will be near the left hand end of the repulsion iron 13 in Figure 6. As the pointer moves up scale the vane 15 moves to the right in the direction of the arrow toward the apex 31 of the wedge 13. Owing to the current flowing through the winding 11, the upper edge forming one pole face of the iron 13 will be magnetized with one polarity and the lower edge forming another pole face will be magntized with the opposite polarity, assumed to be north and south, respectively, for the sake of illustration. The upper end of the vane 15 will be magnetized with the same polarity as the upper edge of the iron 13, in this case north and the lower end will be magnetized with the same polarity as the lower edge of the iron 13, in this case south. Magnetic repulsion between like poles will tend to drive the vane 15 away from the position opposite the base 30 of the wedge where the like poles are closest together toward the apex 31 of the wedge where the like poles are farther apart. As the current increases, and the vane 15 moves up scale the effect of greater current is balanced by the fact that the control spring 27 offers greater opposition when the vane moves to the right and also by the fact that the like poles are continually farther apart so that the force of repulsion for a given current becomes less and less. The consequence, if repulsion alone is relied upon, particularly when the angular deflection becomes large is that larger and larger increments of current become necessary to produce a given increment of angular deflection as the instrument moves up scale. Stated another way, the scale becomes more and more crowded toward the upper end.

The presence of the attraction irons 12 and 14, however, tends to overcome this scale crowding and opens up the upper end of the scale by introducing a magnetic attractive force which becomes greater as the vane 15 moves up scale. It will be apparent that the magnetic field produced by the current flow through the winding 11 also magnetizes the irons 12 and 14. With the direction of current flow assumed, the lower edge 34 forming one pole face of the iron 12 will be magnetized with south polarity and the upper edge 35 forming a pole face of the iron 14 will be magnetized with north polarity. The inner edges 34 and 35 of the irons converge toward the end corresponding to the up-scale position of the vane 15 so that the unlike north and south poles at the ends of the vane 15 and at the edges of the irons 12 and 14 becomes closer and the attraction force tends to draw the vane 15 in the up-scale direction. The repulsion between like poles at the ends of the vane 15 and the edges of the iron 13, and the attraction between unlike poles at the ends of the vane 15 and the inner edges of the irons 12 and 14 both tend to drive the vane 15 up scale, but the relative effects of these two forces vary as the vane moves up scale for the reason that the ratio of the respective distances between like and unlike poles varies.

As the vane 15 moves to the upper limit of its travel there is another action taking place between the repulsion iron 13 and the movable vane 15 tending to produce crowding at the upper end of the scale. There is counter repulsion between the movable iron 15 and the stationary iron 13 which tends to drive the iron 15 back from the apex 31 of the stationary iron 13. The presence of the attraction irons 12 and 14 however tends to reduce this counter repulsion. If desired the outer corners of the attraction irons 12 and 14 may be rounded at 36, 37, 38 and 39 in order to reduce counter repulsion from the outer edges of the attraction irons 12 and 14 which occurs when the movable iron 15 stands near the ends of the scale. Although I do not find it necessary to round the outer corners of the attraction irons in this manner I find that by this expedient I am enabled to increase the scale length approximately 10 per cent.

By suitable dimensioning and shaping of the parts I may obtain variations in scale distribution. However, my construction also lends itself to obtaining the desired modifications in the scale distribution even in the case of instruments which have been finally constructed. Such modification in scale distribution may be desirable, for example, when it is desired to cause two given voltages or currents to produce deflections of the pointer to two predetermined respective angular positions on the scale. The adjustment of the deflection for only one voltage or current value, of course, can be obtained by varying the strength of the winding 11 as by connecting resistances in series or shunt or by sliding the winding 11 axially away from the stationary and movable irons. The scale distribution of any given instrument as finally constructed may be varied, for example, by varying the spacing of the stationary irons 12, 13 and 14 or by changing the angular position of one or more of the irons. In an arrangement such as represented by Figures 2 and 6 the upper end of the scale may be expanded by decreasing the axial displacement $t$ between the repulsion iron 13 and the attraction irons 12 and 14. By increasing this axial displacement $t$ I may expand the lower end of the scale. This adjustment may be obtained in any desired manner, for example, by adding or removing washers 40 between the portion 16 of the winding spool and the cups 18 and 19, to which the attraction irons 12 and 14 are secured when adjustment is to be obtained by movement of the cups 18 and 19.

If adjustment of the scale distribution is obtained by rotation of the cup-shaped members 18 and 19 carrying the attraction irons 12 and 14, respectively, the upper end of the scale may be expanded by rotating the cup-shaped members 18 and 19 in such a direction as to reduce the average distance between the unlike poles at the ends of the vane 15 and at the inner edges of the irons 12 and 14, namely, by moving irons 12 and 14 to the left or in a down scale direction as represented in Figure 6. For expanding the lower end of the scale one or both of the cup-shaped members would be rotated in the opposite direction. When the desired adjustment is obtained the cup-shaped members are secured in their angular position by tightening the screws 25.

Scale distribution of the instrument may also be changed by an actual change in the design of the instrument, for example, by changing the slope or in some other manner changing the shape of the stationary or movable irons or by changing their positions. For example, increasing the slopes of the inner edges 34 and 35 of the attraction irons 12 and 14 will tend to produce further expansion of the upper end of the scale. By way of illustration the effect of greater slope is represented by the voltmeter scale shown in Figure 8. If the repulsion iron 13 is made sharper, i. e., with greater convergence of the edges, and the convergence of the inner edges of the attraction irons 12 and 14 is correspondingly increased, a scale approximately the same as that shown in Figure 1 may be obtained, but I prefer the approximate shapes as shown in Figure 6 for the scale distribution of Figure 1 as I find that the desired scale may be obtained with the least amount of adjustment by using these shapes.

The lower end of the scale may be expanded or opened up by making the outer edges of the repulsion iron concave as shown at 41 and 42 in Figure 7. The shapes and spacings of the various irons illustrated in Figure 7 gave the scale distribution represented in Figure 5. Inasmuch as ammeters are more apt to be used throughout the scale range, whereas voltmeters are most frequently applied to measuring values nearer the upper end of the scale range, the scale distribution represented in Figure 5 having the lower end relatively more open than the scale shown in Figure 1 may be preferred for ammeters, whereas the scale shown in Figure 1 may be preferred for voltmeters. It will be understood, however, that my invention is not limited to the use of one scale distribution for ammeters and another for voltmeters, but that the various scale distributions and further modifications I mention are merely illustrative of the type of scale distribution which can be obtained by carrying out my invention. As is well known to those skilled in the art, the instrument will have its coil 11 wound with a relatively small number of turns of heavy wire when serving as an ammeter and a large number of turns of fine wire when serving as a voltmeter, or the conversion to an ammeter or a voltmeter may be made by connecting a shunt across the coil to form an ammeter and connecting a high resistance in series with it to form a voltmeter instead of changing the winding.

Modification of the scale distribution is not limited to the variations which may be obtained by changing the shape of the stationary irons. For example, by changing the shape of the movable vane 15 from rectangular to trapezoidal as shown at 43 in Figure 6 I may compress the scale somewhat for the range between 90 and 130 volts and may expand the scale somewhat for the range below 70 and above 130 volts.

I have herein shown and particularly described certain embodiments of my invention and certain methods of operations embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent in the United States is:

1. A long scale current responsive instrument comprising a substantially cylindrical hollow winding form, a current conducting winding surrounding said form, a member mounted pivotally within said winding form and carrying a magnetizable vane spaced from the inner cylindrical surface of said winding form, a stationary magnetizable sheet of wedge shape bent to conform to the inner surface of said form and mounted therein midway between the ends thereof, the base of said wedge being parallel with the axis of said winding form and the edges of said wedge forming converging helices on the inner surface of said form, a pair of magnetizable auxiliary sheets also of wedge shape and bent to conform to the inner surface of said winding form movably fitting in the ends thereof, the outer edges of said auxiliary sheets lying along circles and the inner edges forming helices converging toward each other, the converging ends of said auxiliary sheet helices being near the converging ends of said main sheet helices, a pair of magnetizable cup-shaped members with circular openings substantially in the centers of the bases thereof, the edges of said circular openings meeting the outer edges of said auxiliary sheets, said cup-shaped members having flanged portions extending toward each other to enclose said winding partially and being secured to said auxiliary sheet members, and means for adjusting the angular positions of at least one of said cup-shaped members.

2. A current responsive instrument comprising a pair of relatively movable magnetizable members and a current conducting coil in inductive relation to said members, one of said members comprising a movable vane, and the other of said members comprising a repulsion iron located near the path of the said vane and lying along the path of said vane, and an attraction iron also near and lying along the path of said vane and having a pole face progressively varying in distance from the actual path of said vane.

3. A current responsive instrument comprising a current conducting coil, stationary and movable irons in inductive relation to said coil, said movable iron being biased to oppose motion in a given direction referred to as the up-scale direction, said stationary irons including a repulsion iron having edges magnetized with the same polarity as adjacent ends of said movable iron and being tapered so that the distances between the ends of said movable iron and the edges of said repulsion iron become greater as the movable iron moves up scale, said stationary irons also including an attraction iron having a pole face adjacent the positions occupied by the end of said moving iron and sloping in such a direction as to decrease the distance between said movable iron and the said pole face of said attraction iron as the movable iron moves up scale, and means for adjusting the position of said attraction iron.

4. A measuring instrument comprising a pair of stationary magnetizable members and a movable magnetizable member, means for magnetizing said members in dependence upon the magnitude of a quantity to be measured, said movable member having a pair of polar portions, said stationary members having relatively wide pole faces and being so shaped that a pole face of one of said stationary members extends approximately along the path of one of the polar portions of said movable member, and a pole face of the other of said stationary members also extends approximately along the path of one of the polar portions of said movable member, said members being so placed that one of said stationary pole faces is magnetized with the same polarity as the adjacent polar portion of the movable member and the other of said stationary pole faces is magnetized with opposite polarity to that of the adjacent polar portion of the said movable member, said latter pole face being sloped to approach progressively closer to the path of said movable member.

5. A current responsive instrument comprising a current conducting coil having an opening therein extending substantially parallel with the magnetic axis of said coil, a pair of cup-shaped members of magnetizable material with bases at the ends of said coil and flanges extending toward each other and surrounding the ends of said coil, and a pair of relatively rotatable members mounted within said opening, said members having a given direction of relative rotation referred to as "upscale", the axis of rotation being substantially parallel with the magnetic axis of the coil, one of said members comprising a repulsion iron and an attraction iron extending circumferentially along the surface of a cylinder having an axis substantially parallel with the magnetic axis of said coil, the other of said relatively rotatable members comprising a magnetizable vane substantially parallel with said axis of rotation and with ends in proximity to the edges of said repulsion iron, said attraction iron having an edge sloping progressively closer toward one of the ends of said repulsion iron in the direction of relative up scale motion of said vane.

STEPHEN C. HOARE.